United States Patent [19]
Le et al.

[11] Patent Number: 6,161,877
[45] Date of Patent: Dec. 19, 2000

[54] CONDUIT INTERLOCK ASSEMBLY

[75] Inventors: Paul Le; Phong Pham, both of San Jose; Larry Meehan, Morgan Hill; Long Nguyen, Fremont, all of Calif.

[73] Assignee: Applied Materials, Inc., Santa Clara, Calif.

[21] Appl. No.: 09/318,680

[22] Filed: May 25, 1999

[51] Int. Cl.[7] .................................................. F16L 35/00
[52] U.S. Cl. ............................................. 285/93; 285/119
[58] Field of Search ........................... 285/93, 80, 119, 285/114

[56] References Cited

U.S. PATENT DOCUMENTS 3,595,228  7/1971  Simon et al. .
3,826,461  7/1974  Summerfield et al. .
3,845,657  11/1974  Hall et al. .
4,621,200  11/1986  Lovrenich .

*Primary Examiner*—Dave W. Arola
*Attorney, Agent, or Firm*—Thomason, Moser & Patterson

[57] ABSTRACT

A conduit interlock assembly for being clamped to portions of a pair of conduits which portions are adjacent an end-to-end interconnection between the two conduits and which conduit interlock assembly is for surrounding a conduit fastener or fasteners fastening the conduits together in the end-to-end connection. The conduit interlock assembly includes a normally open switch for being closed upon the conduit interlock assembly being clamped to the conduits to provide an indication that the conduits are in the end-to-end interconnection and which switch is opened upon the conduit interlock assembly being unclamped from the conduits to provide an indication that the conduits possibly are not in the end-to-end interconnection.

7 Claims, 3 Drawing Sheets

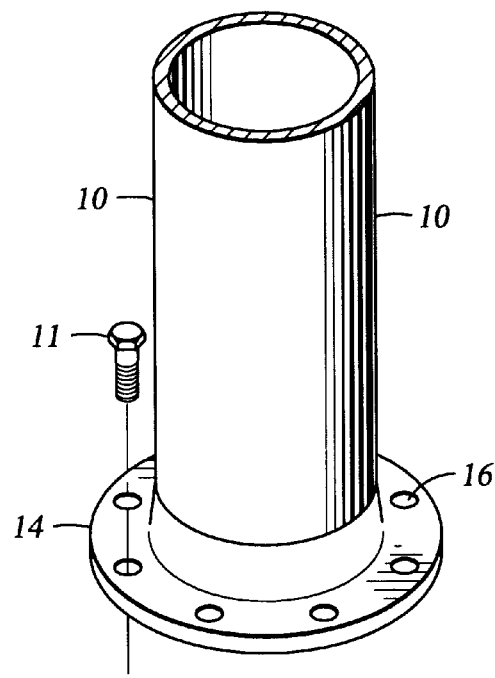
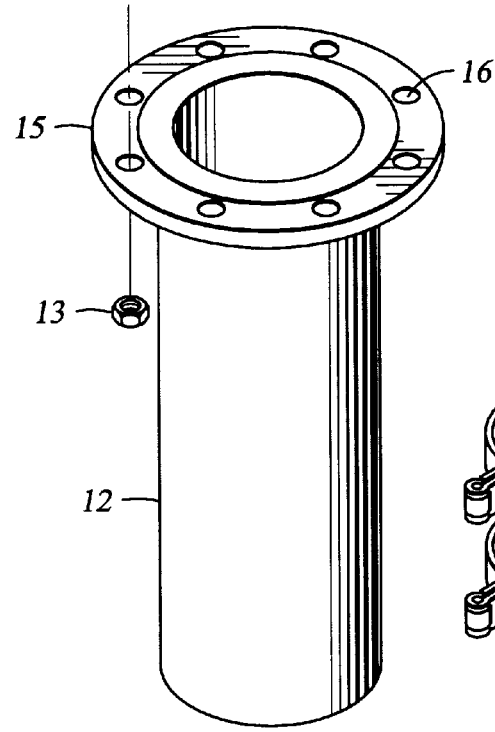
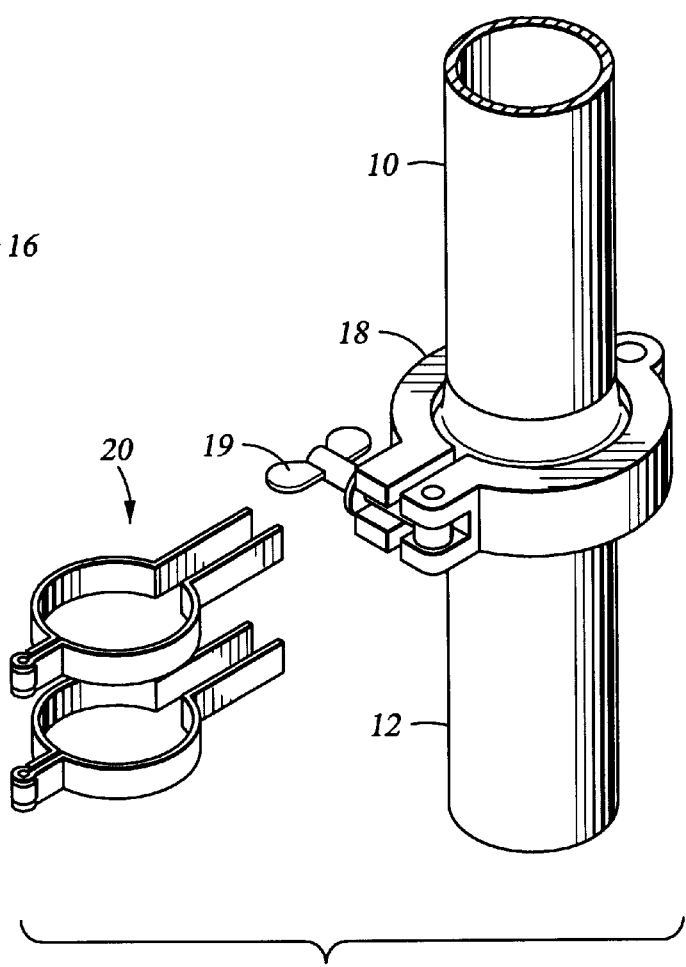
Fig. 1
Fig. 2

CONDUIT INTERLOCK ASSEMBLY

BACKGROUND OF THE DISCLOSURE

1. Field of the Invention

This invention relates generally to a conduit interlock assembly. More particularly, this invention relates to a conduit interlock assembly comprising clamping members clamped around a conduit.

2. Description of the Background Art

Conduits are used to conduct numerous types of fluids and gases within a semiconductor wafer processing system. Such fluids and gases can be harmful to humans and if the end-to-end interconnection between a pair of conduits conducting the fluid is unintentionally or inadvertently opened, or partially opened, the fluid or gas can escape causing harm to humans. Such conduits are typically provided in finite or discrete lengths and the ends of the conduits are typically provided with outwardly extending radial flanges. The flanges may be provided with holes through which headed bolts extend to fasten the flanges, and thereby the conduits, together in the end-to-end interconnection upon nuts being attached to the bolts. Alternatively, flanged conduits can be interconnected by a fastener which is clamped around such flanges and such fastener may be of the type known to the art as a KF-40 clamp.

Commercial processing fluids or gases are conducted by such conduits and upon the end-to-end interconnection between the conduits being unintentionally or inadvertently broken, or at least partially broken, the processing fluid or gas can escape and cause damage to surrounding industrial processing apparatus. For example, and not by way of limitation, in a chemical vapor deposition process for processing semiconductor wafers, a pair of conduits can conduct different hazardous gases (e.g., nitrogen fluoride, silane, and so on), and in the event that the end-to-end interconnection between a pair of conduits conducting the process gas is unintentionally or inadvertently broken, or at least partially broken, the process gas can escape and cause damage if not ruination to the semiconductor wafers being processed and to the semiconductor wafer processing apparatus.

Accordingly, there exists a need in the art for apparatus for providing an indication that the conduits are in the end-to-end interconnection and for providing an indication that the conduits are not in the end-to-end interconnection.

SUMMARY OF THE INVENTION

The present invention is a conduit interlock assembly for being clamped to portions of a pair of conduits. The conduit portions are adjacent an end-to-end interconnection between the two conduits and the conduit interlock assembly is for surrounding a conduit fastener or fasteners fastening the conduits together to form the end-to-end connection. The conduit interlock assembly includes a normally open switch that is closed upon the conduit interlock assembly being clamped to the conduits. The closed switch provides an indication that the conduits are in the end-to-end interconnection and when the switch is opened, upon the conduit interlock assembly being unclamped from the conduits, the switch provides an indication that the conduits possibly are not in the end-to-end interconnection.

BRIEF DESCRIPTION OF THE DRAWINGS

The teachings of the present invention can be readily understood by considering the following detailed description in conjunction with the accompanying drawings, in which:

FIG. 1 is a generally perspective partial view depicting a pair of flanged conduits;

FIG. 2 depicts a pair of flanged conduits clamped together by a conduit fastener in an end-to-end interconnection and a conduit interlock assembly embodying the present invention;

To facilitate understanding, identical reference numerals have been used, where possible to designate identical elements that are common to the figures.

DETAILED DESCRIPTION

Figure 3:
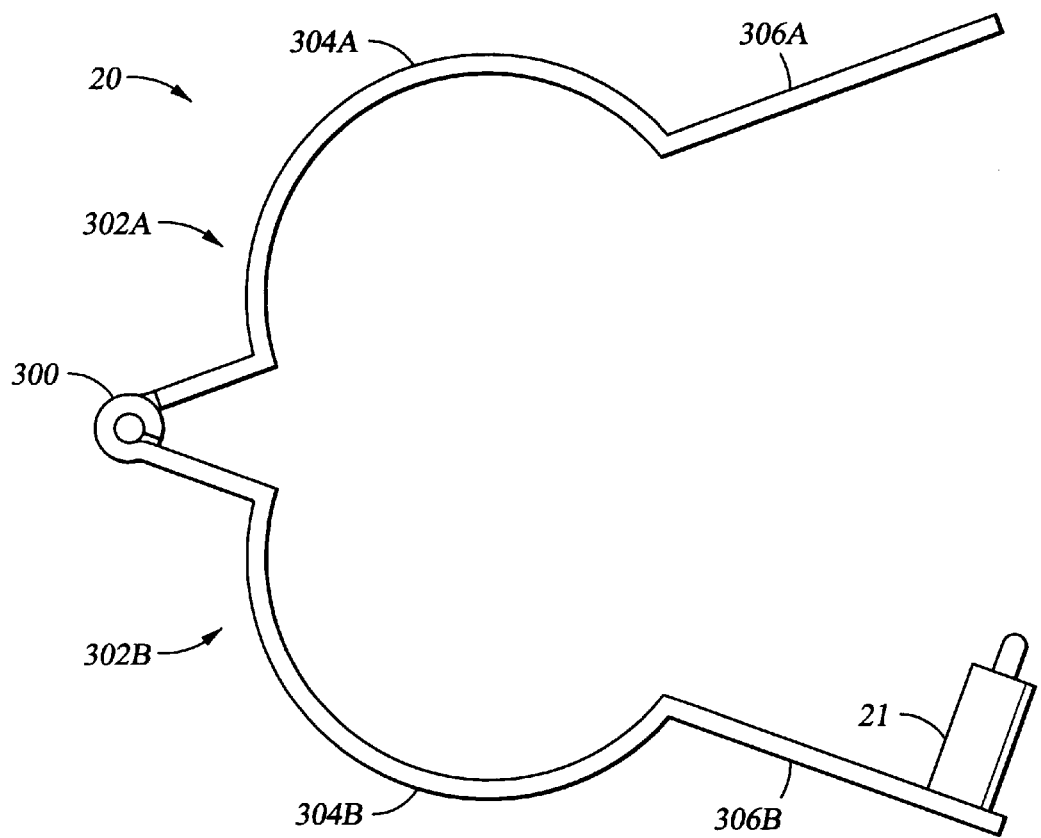
FIG 3 is a diagrammatical side view of a conduit interlock assembly embodying the present invention showing the assembly in its open position.

FIG. 1 depicts portions of a pair of hollow cylindrical conduits 10 and 12 having respective and opposed end portions that are provided with radially outwardly extending annular flanges 14 and 15 through which a plurality of holes 16 extend. The conduits 10 and 12 may be interconnected in an end-to-end, or abutting, interconnection by a plurality of headed bolts (one of which is shown as bolt 11) extending through the holes 16. Threaded nuts (one of which is shown as nut 13) are attached to the bolts to fasten the flanges 14 and 15 together. In this manner, the conduits 10 and 12 are attached in an end-to-end interconnection.

Alternatively, as depicted in FIG. 2, the conduits 10 and 12 may be interconnected in an end-to-end interconnection by a clamp 18 of the type known to the art for surrounding the flanges 14 and 15 shown in FIG. 1. The clamp 18 includes a wing nut 19 that is tightened to clamp the flanges together thereby clamping the conduits 10 and 12 in the end-to-end interconnection. The clamp 18 is a commercially available clamp that is known to the art as a KF-40 clamp.

FIG. 2 depicts a conduit interlock assembly 20 embodying the present invention. The conduit interlock assembly 20 is clamped to portions of the conduits 10 and 12 adjacent the end-to-end interconnection between the conduits. Generally, the assembly 20 is clamped over or around the conduit fastener, either the above-mentioned head bolts 11 and nuts 13 shown in FIG. 1 or the clamp 18 shown in FIG. 2.

Figure 4:
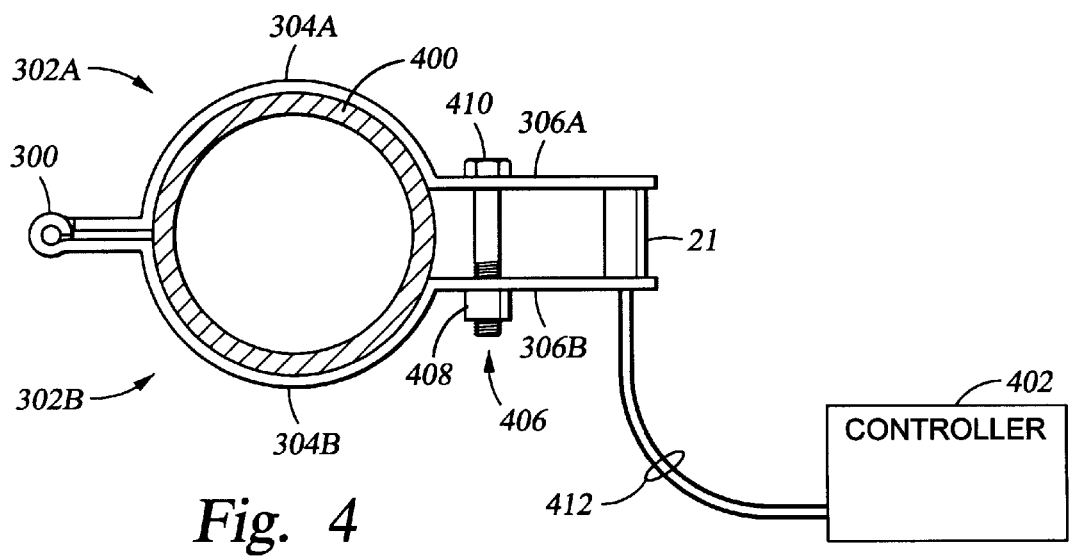
FIG. 4 is a diagrammatical side view of the conduit interlock assembly of the present invention shown in the closed position and showing the switch closed to complete an electrical circuit to a controller for providing an indication that the conduits of FIGS. 1 and 2 are in the end-to-end interconnection.

A general understanding of the conduit interlock assembly 20 of the present invention may be obtained by reference to FIGS. 3 and 4 where the conduit interlock assembly 20 is shown, diagrammatically in its respective opened and closed positions. The conduit interlock assembly 20 includes a pair of clamping members 302A and 302B pivotably interconnected by a hinge 300. These clamping members include arcuate sections 304A and 304B and outwardly extending members 306A and 306B; a normally open switch 21 is mounted to the outwardly extending member 306B. In use, conduit interlock assembly 20 is placed over or around the fastener fastening the conduits 10 and 12 (FIGS. 1 and 2). The arcuate sections 304A and 304B encircle portions of the conduits 10 and 12 adjacent the end-to-end interconnection between the conduits (such conduit portions being identified diagrammatically in FIG. 4 as 400) and the clamping members 302A and 302B are clamped around the conduit portions 400 to place the conduit interlock assembly 20 in its closed position by a suitable fastener extending through the outwardly extending members 306A and 306B; the fastener 406 may be a fastener of the type known to the art as a PEM nut 408 and an associated screw 410.

Upon the conduit interlock assembly 20 being clamped around the conduit portions 400 and into its closed position shown diagrammatically in FIG. 4, the normally open switch 21 is closed to complete an electrical circuit indicated generally as 412 to, for example, a suitable controller 402 for providing an indication that the conduits 10 and 12, FIGS. 1 and 2, are in the end-to-end interconnection. It will be further understood that upon the conduit interlock assembly 20 being unclamped from the conduits 10 and 12, FIGS. 1 and 2, and returned to the open position shown in FIG. 3, the switch is re-opened, the electrical circuit 412 is opened and the controller 402 will provide an indication that possibly the conduits 10 and 12 are not in the end-to-end interconnection.

Figure 5:
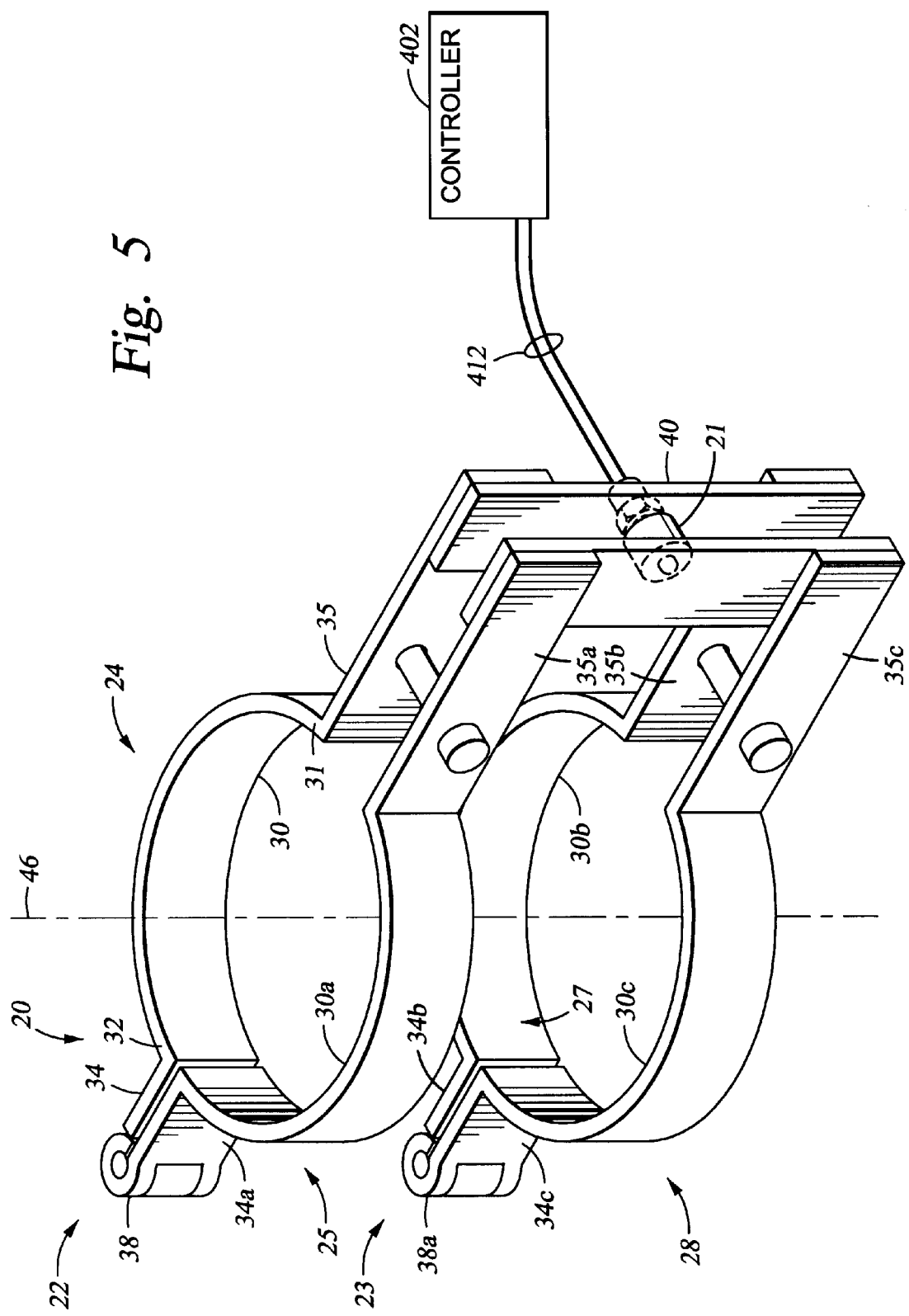
FIG. 5 is a perspective detailed view of the conduit interlock assembly of the present invention showing the included switch connected to a controller.

Referring now to FIG. 5, the structure of the conduit interlock assembly 20 is shown in detail. The conduit interlock assembly 20 includes two pairs of generally opposed, outwardly curved, and pivotally interconnected clamping members 22 and 23; the pair of clamping members 22 comprises the clamping members 24 and 25 and the pair of clamping members 23 comprises the clamping members 27 and 28.

The detailed structure of each clamping member comprising the pairs of clamping members 22 and 23 will be described in detail with regard to representative clamping member 24 shown in FIG. 5. The clamping member 24 includes a generally central arcuate outwardly curved portion 30 including a pair of spaced apart and generally opposed end portions 31 and 32, and first and second generally opposed linear members 34 and 35 formed integrally with and extending outwardly and in opposite directions from the end portions 31 and 32 of the arcuate portion 30. Accordingly, it will be further understood that the clamping member 25 includes an arcuate portion 30a and opposed linear members 34a and 35a, that clamping member 27 includes the arcuate portion 30b and the opposed linear members 34b and 35b and that the clamping member 28 includes the arcuate portion 30c and linear members 34c and 35c.

The conduit interlock assembly 20 further includes a pair of generally opposed elongate planar members 40 and 42 mounted suitably to and disposed generally perpendicularly to the two pairs of clamping members 22 and 23. The members 40 and 42 reside adjacent the end-to-end interconnection between the conduits 10 and 12 (shown in FIGS. 1 and 2) upon the two pairs of clamping members 22 and 23 being clamped to the conduits 10 and 12. More particularly, the elongate planar members 40 and 42 are mounted respectively and perpendicularly to linear members 35 and 35b and to linear members 35a and 35c. As such, the linear members 35, 35a are maintained by a spaced apart relation with respect to the linear members 35b, 35c.

More specifically the opposed generally cylindrical arcuate outwardly curved portions 30, 30a, 30b and 30c of the two pairs of clamping members 22 and 23 are spaced apart axially as indicated by the axis 46 to provide axial space between the opposed arcuate portions 30, 30a, 30b and 30c of the pairs of clamping members 22 and 23 to receive the conduit fasteners, for example the fastener 18 shown in FIG. 2. Such spacing permits the conduit interlock assembly 20 of the present invention to be clamped to the pairs of conduits 10 and 12 (FIGS. 1 and 2) and around or over the fastener which fastens the conduits together in the end-to-end interconnection.

Accordingly, it will be understood that the conduits 10 and 12 of FIGS. 1 and 2, cannot be unfastened from each other intentionally or inadvertently unless the conduit interlock assembly 20 of the present invention is first unclamped from the conduits. Accordingly, upon the conduit interlock assembly 20 of the present invention being clamped to the conduits 10 and 12, the normally open switch 21 will be closed to provide an indication that the conduits are in the end-to-end interconnection. Upon the conduit interlock assembly 20 of the present invention being unclamped from the conduits 10 and 12, the normally open switch 21 will be reopened to provide an indication that possibly the conduits are not in the end-to-end interconnection. It will be understood that the term "possibly" is used because it is possible that the conduit interlock assembly of the present invention can be intentionally unclamped from the conduits 10 and 12 while the conduits remain in the end-to-end interconnection.

The clamping members 24, 25, 27 and 28, and elongate planar members 40 and 42, may be made of aluminum and the elongate planar members may be suitably mounted to the clamping members by brazing.

Although various embodiments which incorporate the teachings of the present invention have been shown and described in detail herein, those skilled in the art can readily devise many other varied embodiments that still incorporate these teachings.

What is claimed is:

1. A conduit interlock assembly, comprising:

two pairs of clamping members having open and closed positions, a pair of lateral members mounted to said clamping members and a fastener for fastening said lateral members together to place said clamping members in said closed position; and a normally open switch mounted to one of said lateral members and for being engaged and closed by the other of said lateral members upon said lateral members being fastened together.

2. The conduit interlock assembly of claim 1 wherein each of said clamping members including a generally central arcuate outwardly curved portion including a pair of spaced apart and generally opposed end portions, first and second generally diametrically opposed linear members formed integrally with and extending outwardly from said end portions of said arcuate outwardly curved portion, the first linear members of each pair of clamping members being pivotally interconnected and the second linear members of each pair of clamping members being connected to one of said lateral members, said outwardly curved portions of each pair of clamping members being spaced apart axially from the outwardly curved portions of the other pair of said clamping members.

3. The conduit interlock assembly of claim 1 wherein the clamping members are spaced apart to establish clearance for a conduit fastener.

4. A conduit interlock assembly, comprising:

two pairs of pivotally interconnected clamping members for being clamped around conduit portions of a pair of conduits which conduit portions are adjacent an end-to-end interconnection between the pair of conduits, said clamping members being spaced apart to provide space for receiving a conduit fastener which fastens the pair of conduits in the end-to-end interconnection;

fastener for fastening said pair of clamping members together to clamp said clamping members around the conduit portions and the conduit fastener;

said clamping members provided with a pair of generally opposed outwardly extending members for residing adjacent the end-to-end interconnection between the conduits upon said clamping members being clamped around the conduit portions and the conduit fastener; and a normally open electrical switch mounted on one of said outwardly extending members and for being engaged and closed by the other of said outwardly extending members upon said clamping member being clamped around the conduit portions and the conduit fastener, upon said switch being closed said switch completing an electrical circuit to provide an indication that the conduits are interconnected in the end-to-end interconnection, and upon said clamping members being unclamped from said conduit portions and the conduit fastener, said switch being disengaged from said other outwardly extending member and opened to open the electrical circuit to provide an indication that the conduits possibly are not in the end-to-end interconnection.

5. The assembly according to claim 4 wherein each of said clamping members includes a generally central arcuate outwardly curved portion including a pair of spaced apart and generally opposed end portions, first and second generally diametrically opposed linear members formed integrally with and extending outwardly from said end portions of said arcuate outwardly curved portion, the first linear members of each pair of said two pairs of clamping members being pivotally interconnected and the second linear members of each pair of said clamping members being connected to one of said generally central arcuate outwardly curved portions.

6. Conduit interlock assembly, comprising:

two pairs of generally opposed, outwardly curved and pivotably interconnected clamping members and a pair of interconnecting members interconnecting said two pairs of clamping members, said clamping members for being clamped around conduit portions of a pair of conduits which conduit portions are adjacent an end-to-end interconnection between the pair of conduits, and said clamping members being spaced apart to provide space for receiving a conduit fastener which fastens the pair of conduits in the end-to-end interconnection;

fastener for fastening said pair of interconnecting members together to clamp said clamping members around the conduit portions and the conduit fastener;

said interconnecting members comprising a pair of generally opposed elongate planar members mounted to and disposed generally perpendicularly to said clamping members and for residing adjacent the end-to-end interconnection between the conduits upon said clamping members being clamped around the conduit portions and the conduit fastener; and a normally open electrical switch mounted on one of said elongate planar members and for being engaged and closed by the other of said elongate planar members upon said clamping member being clamped around the conduit portions and the conduit fastener, upon said switch being closed said switch completing an electrical circuit to provide an indication that the conduits are interconnected in the end-to-end interconnection, and upon said clamping members being unclamped from the conduit portions and the conduit fastener, said switch being disengaged from said other elongate planar member and opened to open the electrical circuit to provide an indication that the conduits possibly are not in the end-to-end interconnection.

7. The assembly according to claim 6 wherein each of said clamping members includes a generally central arcuate outwardly curved portion including a pair of spaced apart and generally opposed end portions, first and second generally diametrically opposed linear members formed integrally with and extending outwardly from said end portions of said arcuate outwardly curved portion, the first linear members of each pair of said two pairs of clamping members being pivotally interconnected and the second linear members of each pair of said two pairs of clamping members being mounted to one of said elongate planar members.

* * * * *